(12) United States Patent
Maeda et al.

(10) Patent No.: US 7,903,361 B2
(45) Date of Patent: Mar. 8, 2011

(54) METHOD OF DETECTING SCRATCH DEFECT IN CIRCUMFERENTIAL DIRECTION AND MAGNETIC DISK CERTIFIER

(75) Inventors: Sumihiro Maeda, Kanagawa (JP); Yasuhiro Tokumaru, Kanagawa (JP)

(73) Assignee: Hitachi High-Technologies Corporation, Tokyo (JP)

( * ) Notice: Subject to any disclaimer, the term of this patent is extended or adjusted under 35 U.S.C. 154(b) by 960 days.

(21) Appl. No.: 11/751,166

(22) Filed: May 21, 2007

(65) Prior Publication Data
US 2007/0271487 A1    Nov. 22, 2007

(30) Foreign Application Priority Data
May 22, 2006  (JP) ................. 2006-141376

(51) Int. Cl.
*G11B 5/09*  (2006.01)
(52) U.S. Cl. .......................................... 360/53
(58) Field of Classification Search ............ 473/415, 473/430, 446; 463/50, 56; 434/11, 19, 247; 273/440; 360/53, 31, 48, 60, 75; 356/237.1, 356/237.2; 348/170; 382/173
See application file for complete search history.

(56) References Cited

U.S. PATENT DOCUMENTS

| | | | | |
|---|---|---|---|---|
| 5,135,303 A * | 8/1992 | Uto et al. | ................... | 356/237.2 |
| 5,907,630 A * | 5/1999 | Naoi et al. | ................... | 382/173 |
| 6,078,385 A * | 6/2000 | Yoshiyama et al. | ........ | 356/237.1 |
| 6,233,008 B1 * | 5/2001 | Chun | .............................. | 348/170 |
| 7,251,908 B2 * | 8/2007 | Yori | ............................... | 360/75 |
| 7,583,461 B2 * | 9/2009 | Kudoh et al. | ................... | 360/53 |

FOREIGN PATENT DOCUMENTS

| | | |
|---|---|---|
| JP | 10-275434 | 10/1998 |
| JP | 2000-57501 | 2/2000 |
| JP | 2000-57502 | 2/2000 |

\* cited by examiner

*Primary Examiner* — Fred Tzeng
(74) *Attorney, Agent, or Firm* — Mattingly & Malur, P.C.

(57) ABSTRACT

In the present invention, an inspection area for sampled defect data is set which has a predetermined width in the radial direction of a magnetic disk and a length round the circle of the magnetic disk in the circumferential direction thereof or a predetermined length in the circumferential direction thereof, and while limiting the defect data in the inspection area and shifting a narrow and long search frame within the area, continuing defects in the region of the search frame are followed up and detected, thereby, only curved line shaped continuing defects having comparatively large curvature near to the circle of the magnetic disk are selectively detected and acquired as circle shaped defects.

16 Claims, 4 Drawing Sheets

METHOD OF DETECTING SCRATCH DEFECT IN CIRCUMFERENTIAL DIRECTION AND MAGNETIC DISK CERTIFIER

FIELD OF THE INVENTION

The present invention relates to a method of detecting scratch defect in circumferential direction and a magnetic disk certifier (hereinafter will be called as a certifier) and more specifically relates to a certifier, which can detect a scratch defect (circle scratch) along a circumferential direction through an electric characteristic inspection.

BACKGROUND ART

When a magnetic medium in a hard magnetic disk (hereinafter will be simply called as a magnetic disk or disk) used for a computer system is abnormal, since an error is caused in write data or read data, predetermined test data, for example, data of FFh are written on a predetermined track of the disk and then the written data are read by a certifier and whether good or bad of the magnetic medium is certified (an evaluation by an electric characteristic inspection). Incidentally, "h" in the FFh indicates hexadecimal notation and FF implies data of which all bits are "1".

Bit errors to be detected by the certifier include such as a missing of bits, so called missing error (including a bit of which level drops below a predetermined threshold value), a spike error due to bit spiking, a positive modulation error and a negative modulation error. Further, other than the above errors, an error detected when performing detection whether a bit is read under a condition where data are erased is identified as an extra error.

In a hard disk drive device (HDD), a coil type magnetic head (an inductive head) is used for data writing and an MR head is used for reading. These writing head and reading head are integrated as a combined head and a disk recording density is increasing day by day.

For the above referred to defect inspection, there are what is called as concentric inspection in which a magnetic head is caused to seek respective tracks of a magnetic disk and to scan the disk in a concentric shape along the respective tracks to detect defects and what is called as spiral inspection in which the magnetic head (a head carriage) scans the disk in a spiral shape to detect defects.

The former concentric inspection usually takes time for inspecting the entire surface of a disk and shows a poor efficiency. Moreover, recently the number of tracks for inspection is increased and the quality of disks is improved. Actually, the number of tracks having defects is at most about 100 through 200 with respect to the entire tracks. For this reason, a thinning concentric inspection in which a part of tracks to be inspected is thinned out and the latter spiral inspection are frequently performed. Further, even in the latter spiral inspection, the spiral inspection with a thinned pitch is sometimes performed.

As prior art of this sort of defect inspection devices, technology disclosed in JP-H10-275434A, JP-2000-57501A and JP-2000-57502A is to be mentioned.

Depending on a high recording density demand, an actual size of a head assembly (a magnetic head+a suspension spring) used in a recent HDD is about 15 mm~20 mm long for a disk less than 1.8 inch and the size of a magnetic head which is provided at the top end of the suspension spring is about 0.5 mm×0.5 mm or less and is very small even when including a slider of about 3 mm×3 mm. Moreover, the gap between the magnetic head and the magnetic disk comes close to a distance from ten and several nm to several tens nm.

For this reason, when there is a circle scratch, the magnetic disk is highly possible to be determined as defective. Conventionally, such circle scratch was detected by an optical defect inspection, however, some of magnetic disks having a high recording density of these days which are determined acceptable by the optical inspection are determined defective because of detection of a circle scratch by an electric characteristic inspection. For this reason, the judgment of defective disks with the optical inspection is performed by enhancing the detection accuracy of such circle scratch, however, with such measure, disks having a defect other than the objective circle scratch are possibly determined defective which causes a problem to worsen a yield for disk production.

For this reason, detection of such circle scratch by an electric characteristic inspection is demanded, however, at the present time, since the detection limited only to the circle scratch is difficult, detection of line shaped defects is actually performed. Since the line shaped defects include a variety of defects, when the detection of line shaped defects is performed, many defects other than circle scratches are detected, which causes a problem.

Since usual line shaped defects are not ones of circumferential shape, the line shaped defects do not affect much to the electrical characteristics of the disks. Therefore, even if such line shaped defects exist, the disks do not frequently determined defective with regard to the electrical characteristics. When circle scratches are required to be extracted among curved line defects such as S shaped defects and many line shaped defects, criteria such as curvature and curving direction thereof have to be included for the judgment, which makes the judgment difficult and requires time for the judgment.

SUMMARY OF THE INVENTION

An object of the present invention is to resolve such problems in the conventional art and to provide a method of detecting scratch defect in circumferential direction, which permits to detect effectively a circle scratch by an electrical characteristic inspection without deteriorating a yield for the disk production.

Another object of the present invention is to provide a magnetic disk certifier, which permits to detect effectively a circle scratch by an electrical characteristic inspection without deteriorating a yield for the disk production.

A method of detecting scratch defect in circumferential direction or a magnetic disk certifier according to the present invention is constituted in such a manner that through inspection of a magnetic disk defect data and the positions thereof on the magnetic disk are sampled, an inspection area for the sampled defect data is set which has a predetermined width in the radial direction of the magnetic disk and a length round the circle of the magnetic disk in the circumferential direction thereof or a predetermined length in the circumferential direction thereof, through setting a rectangular search frame for the defect data in the inspection area which has a certain width shorter than the predetermined width for the inspection area and a certain length shorter than the predetermined length in perpendicular direction with respect to the width, continuing defects are detected in which a plurality of defects continue in series in a region of the search frame, the search frame is successively shifted according to the continuing direction of the detected continuing defects so that the detected continuing defects are located in the region of the search frame so long as the detected continuing defects continue in the inspection area, and through detecting length or defect number of the detected continuing defects in the entire regions of the search frame before and after the shifting, the continuing defects having a length or a defect number more than a predetermined value is detected as a circle scratch (a scratch defect in circumferential direction) in the inspection area.

As has been explained above, in the present invention, the rectangular search frame follows-up and is shifted along the continuing defects in the circular shaped inspection area set and the detection of the continuing defects is continued until the continuing defects in the inspection area interrupt. Thereby, a total length or a total defect number of the continuing defects is obtained and continuing defects having a length or a defect number more than a predetermined value is extracted as a circle scratch.

Since the continuing defects are followed up with the search frame while limiting in the search region having a predetermined width as referred to above, the present invention can exclude curved line defects not running along the circumferential direction, curved line defects having a small curvature and oppositely, curved line defects having excessively large curvature among curved line shaped continuing defects. The reason thereof is that the curved line other than a circle scratch is cut by the search region into pieces smaller than the circle scratch. Therefore, the detection of these curved line continuing defects other than the circle scratch terminates in the shifting operation of the search frame less than 9 times in the embodiment which will be explained later.

Namely, when setting the inspection area for the sampled defect data having a predetermined width in the radial direction of the magnetic disk and a length round the circle of the magnetic disk in the circumferential direction thereof or a length over a predetermined length in the circumferential direction thereof, the inspection area constitutes an area along the circumferential direction of the magnetic disk and having a certain width in the radial direction. Continuing defects in this area can be restricted to line shaped defects and circle scratch defects, which fit within this width. Moreover, since the circle scratch defects run along the circumference of this region and are contained therein, the defect length or the defect number of the circle scratch defects increases in comparison with those of the line shaped defects.

Accordingly, in order to detect such circle scratch defects, a long and narrow search frame having a certain width and a certain length is set in the inspection area, the search frame is shifted along the direction of continuing defects existing in the region of the search frame to follow up the continuing defects and the length or the defect number of the continuing defects is obtained. Thereby, only curved line shaped continuing defects having comparatively large curvature near to that of the magnetic disk are selectively detected and extracted as a circle scratch.

In this instance, the search frame having a certain width and a certain length is determined in the embodiment in such a manner that when the search frame is shifted by adding 8 or more times, the entire of a minimum length, for example 2 mm, of a circle scratch desired to be detected is covered by the region defined by the added search frames. For this reason, the size (length and width) of the search frame is determined to accept a circular arc piece having ⅛ or less of the minimum length circle scratch desired to be detected. However, since the circle scratch does not necessarily run along a complete circle and the curvatures at the sides of inner and outer circumference are slightly different, the size of the search frame is determined so as to cover these cases.

The search frame is a template frame or a reference frame, which accepts a circular arc piece of a circle scratch having a predetermined curvature and the size of the search frame is desirable to be determined in such a manner that the detection of almost all curved line continuing defects other than the circle scratch desired to be detected terminates in the shifting operation of the search frame by 4~12 times.

In a specific example method of shifting the search frame by adding the same according to the present invention, continuing defects having a length or a defect number bridging over the search frames are detected, and with respect to a start point for searching of the continuing defects in the search frame, when shifting the search frame to a subsequent start point, the shifting direction is set in a direction defined by a line connecting the start point with the last defect (or a defect prior to the last defect by less than 3 defects) in the search frame. Thereby, since detection of linear line shaped defects, which do not form a circular curved line shape is terminated, because the search frame exceeds the width of the inspections area in shifting of the search frame, a variety of line shaped defects are excluded.

Further, since the curved line defects having a small curvature and oppositely the curved line defects having excessively large curvature run out from the search frame during the shifting of the search frame in the above referred to direction depending on the curvature thereof, the subsequent start point is directed to the direction according to the curvature. Thereby, since the search frame is shifted to the direction following up the curvature of the curved line and the search frame is directed to a direction exceeding the inspection area, the number of times for adding the search frame is decreased.

In such manner, through successively following up and shifting the search frame in the inspection area a circle shaped defects can be followed up along the curved line of the continuing defects and detected with a number of times according to the length of the search frame. As a result, the detected continuing defects can be limited substantially to circle scratches depending on the length or the number of defects of the detected continuing defects without being affected by the surrounding line shaped defects.

Herein, the length of the search frame can be selected depending on such as the radius of the magnetic disk and a condition of circle scratches to be detected.

As a result, circle scratches can be effectively detected with an electric characteristic inspection, which unnecessitated the detection of unacceptable magnetic disks (=ill success disks) by increasing detection accuracy of circle scratches based on the optical inspection, thereby, deterioration of yield for magnetic disk production can be prevented.

BRIEF DESCRIPTION OF THE DRAWINGS

FIG. 2 (*b*) is a view for explaining a setting of a search frame and its shifting direction.

FIG. 3 (*b*) is a view for explaining a process of searching after dividing an inspection area into blocks.

DETAILED DESCRIPTION OF THE EMBODIMENTS

Figure 1:
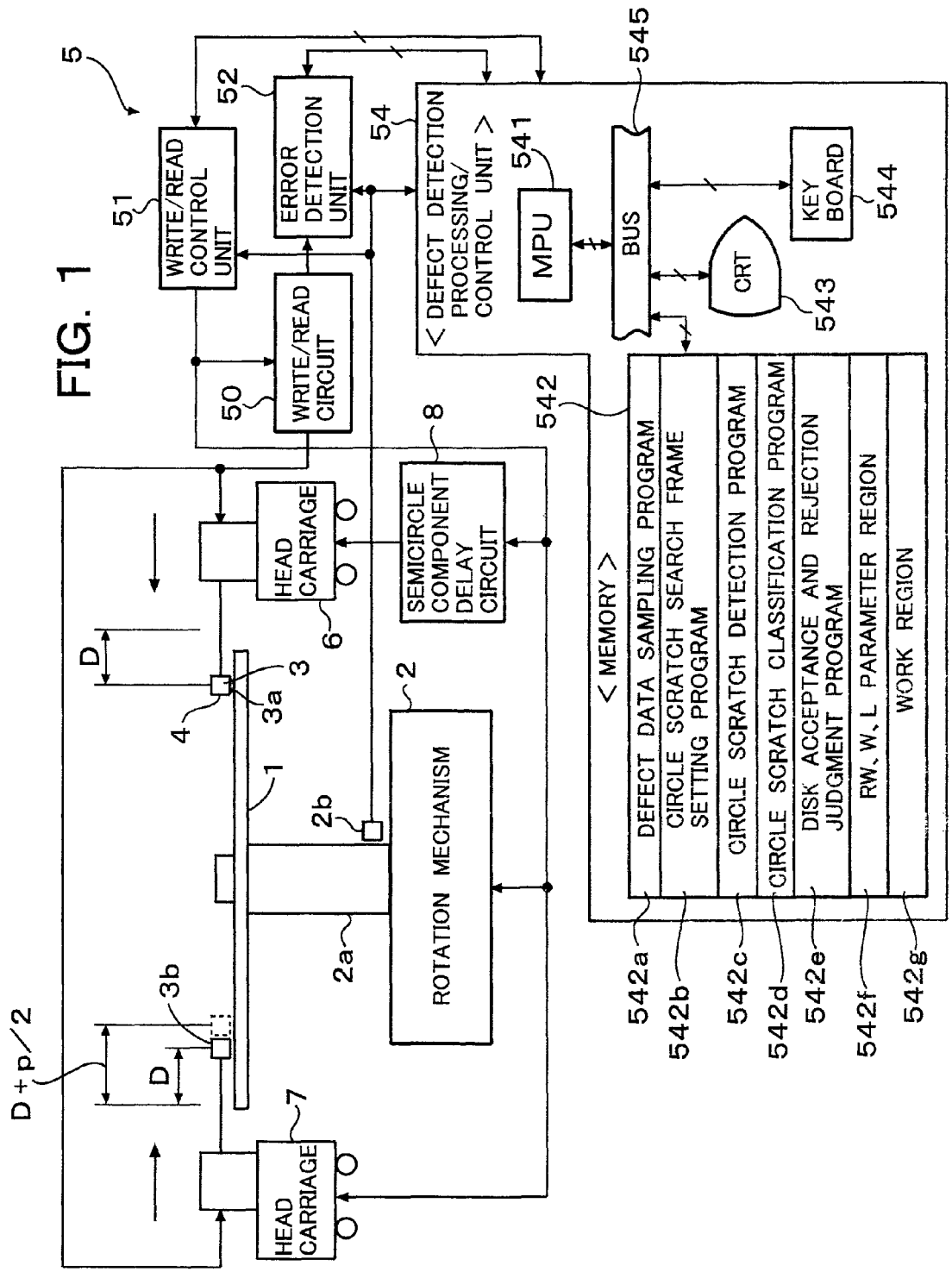
FIG. 1 is a constitutional diagram of one embodiment of a certifier to which the present invention is applied.

In FIG. 1, a magnetic disk 1 is loaded on a spindle 2*a* of a rotation mechanism 2 and is rotated. A rotary encoder 2*b* generates pulses such as INDX pulse, other pulse, etc., for detecting a rotating condition of the spindle 2a and inputs the pulses to a defect detection processing/control unit 54 in an inspection device 5. Upon receipt of these pulses the defect detection processing/control unit 54 detects a reference rotation position (an index, hereinafter will be called as INDX) of the magnetic disk 1 and a rotation angle θ (=rotation amount of magnetic disk) from the reference and calculates a position coordinate of a defect.

At the time of defect inspection, for the rotating magnetic disk 1, an MPU (a microprocessor) 541 provided inside the defect detection processing/control unit 54 sends to a write/read control unit 51 a test pitch signal which determines moving speed in the radial direction of the magnetic disk and test data, for example, the above referred to FFh data.

The write/read control unit 51 contains a head carriage position control circuit and drives a head carriage 7 to cause to seek an inductive magnetic head 3b at writing side along the circumferential direction on the magnetic disk 1 at a predetermined moving speed corresponding to the test pitch send from the MPU 541.

Further, the write/read control unit 51 converts the test data sent from the MPU 541 to a signal having a predetermined current value, sends the same to a write circuit in a write/read circuit 50 with a predetermined timing and through which drives the magnetic head 3b. The write/read control unit 51 received of the INDX signal representing the reference rotation position performs write processing successively of the test data to a predetermined track on the magnetic disk 1 along a locus in a spiral scanning using the received signal as the start point.

Further, the output of the rotary encoder 2b is also inputted to an error detection unit 52 and to the defect detection processing/control unit 54 other than to the write/read control unit 51.

The test data written along the locus in the spiral inspection are read by a head unit 4. The head unit 4 is positioned on a predetermined track on the magnetic disk 1 where the test data are written, by a head carriage 6 of which drive and movement are controlled by the write/read control unit 51. In the head unit 4, an inductive magnetic head 3a and a read MR head 3 are integrated, and the read MR head 3 in the head unit 4 reads the test data.

At the back face side of the magnetic disk 1, the same elements as the magnetic head 3b and the head unit 4 are provided. Since these magnetic head and the head unit are not directly related to the present invention, their illustration is omitted. Although read and write operation of these magnetic heads is likely performed and defect data thereof are likely sampled, herein below, a defect inspection of the front face side of the magnetic disk 1 will be explained and an explanation of the detection inspection of the back face side thereof is omitted.

Read test data are applied to the write/read circuit 50 and sent to the error detection unit 52 via the write/read circuit 50 as a read signal to perform an error detection herein. Error bit data detected by the error detection unit 52 are sent to the defect detection processing/control unit 54 in the inspection device 5, wherein a predetermined analysis processing and other data processing are performed based on the error bit data for the defect detection.

Numeral 8 is a semicircle component delay circuit which circuit receives a movement control signal for moving the carriage from the write/read control unit 51 and delays the movement control signal by a half of the interval time required for one rotation of the magnetic disk 1. This circuit is inserted between the write/read control unit 51 and the head carriage 6 and sends the movement control signal from the write/read control unit 51 to the head carriage while delaying the same by the half interval time.

As a result, although the head carriages 6 and 7 receive the same movement control signal from the write/read control unit 51, since the movement control signal at the side of the head carriage 6 is delayed by a half interval time, the access position on the magnetic disk 1 in the radial direction arrives to the read MR head 3 in the head unit 4 while delaying a half interval time with respect to the access position of the magnetic head 3b positioned by the head carriage 7.

For example, as shown in the drawing, when assumed that the magnetic head 3b at the writing side is positioned at distance D from the outer circumference of the magnetic disk 1 and is performing test data writing, and when the magnetic disk 1 rotates half way round and the position where the test data are written comes to the position of the read MR head 3, the read MR head 3 is also positioned to the distance D from the outer circumference of the magnetic disk 1. When the read MR head 3 is reading the test data, the magnetic head 3b moves to a position D+p/2 from the outer circumference of the magnetic disk 1 as shown by dotted lines and is writing subsequent test data. Wherein p is a movement pitch in radial direction of the magnetic disk 1 during the spiral inspection. Such writing and reading of the test data are continuously performed while shifting by a half interval time through the movement control of the write/read control unit 51 for the carriages 6 and 7.

Thereby, the read MR head 3 can perform scanning of the magnetic disk 1 while following up the same locus as that in the spiral scan by the magnetic head 3a at the writing side.

Further, the respective heads at the initial condition are adjusted so that both heads position substantially on a same track of the magnetic disk and are attached to the respective carriages 6 and 7. Still further, the spiral scan is performed from the outer circumference of the magnetic disk 1 toward the inner circumference and the drive of both head carriages 6 and 7 is started at the same time.

In the defect detection processing/control unit 54, such as MPU 541, a memory 542, a CRT display 543 and a key board 544 are connected each other via a bus 545.

In the memory 542, a defect data sampling program 542a, a circle scratch search frame setting program 542b, a circle scratch detection program 542c, circle scratch classification program 542d and a disk acceptance and rejection judgment program 542e are stored and further such as a parameter region 542f in which size (width W, length L) of the search frame, defect data searching width RW in radial direction and classification reference values of circle scratch such as 1 mm, 10 mm are stored and work region 542g are provided.

In the present embodiment, an average diameter of a defect to be detected is assumed as about 10 μm. In such instance, when 2.5-inch disk is examined, the defect data searching width RW (see FIG. 2 (a)) which restricts a searching range in the radial direction of the defect data, is about 1 mm of which length covers about 100 defects in continuing defects (respective defects when a plurality of defects continue in series) in radial direction. The width of the inspection area P, namely, the defect data searching width RW herein corresponds to a condition where the minimum length of middle size circle scratch to be classified is assumed 1 mm (This is equivalent to ½ of the minimum length (=2 mm) of middle size circle scratch desired to be detected), which will be explained later.

Figure 2A:
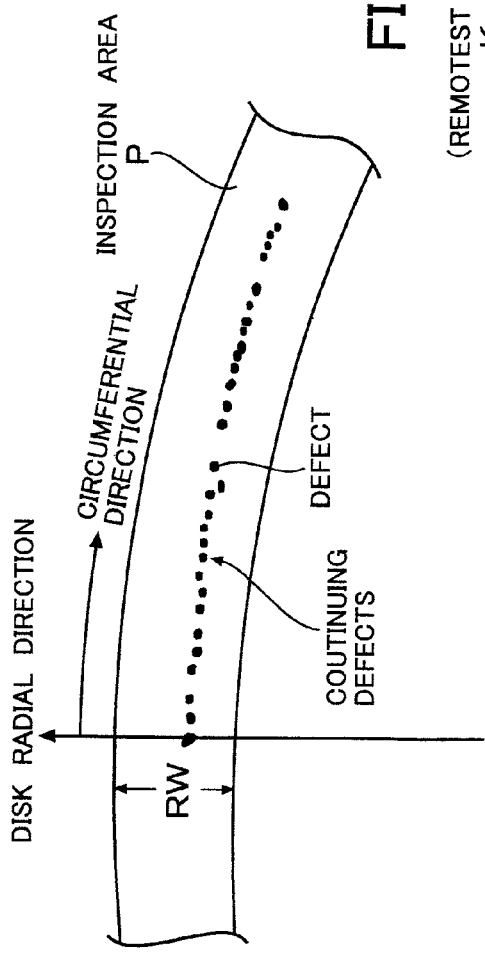
FIG. 2 (*a*) is a view for explaining an inspection area for circle scratch detection.
Figure 2B:
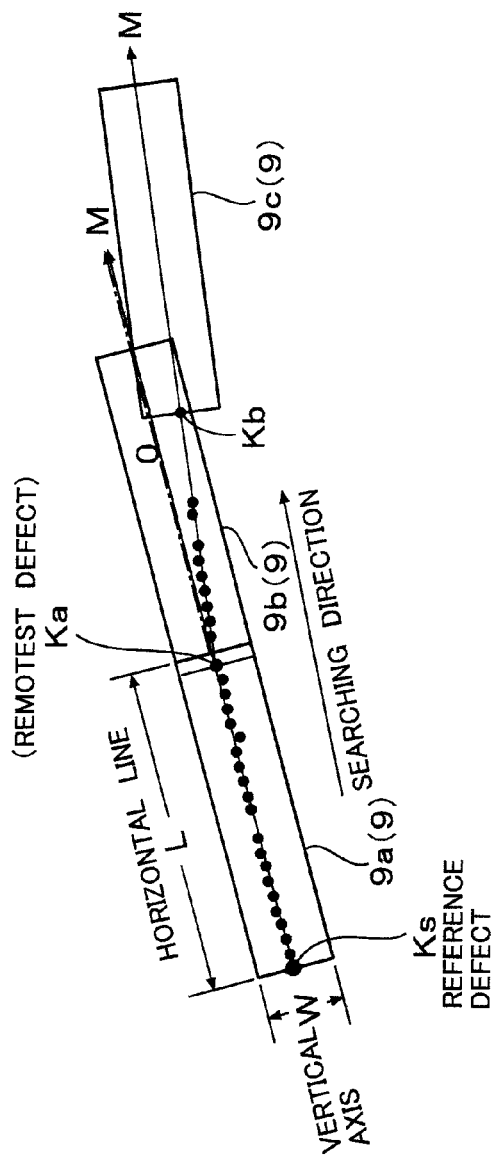

When the search frame (see a search frame 9 in FIG. 2 (b)) is a rectangular follow-up frame and 2.5-inch disk is examined, with regard of the size the width W (vertical axis) is 50 μm, which covers about 5 defects continuing in the radial direction and the length L (horizontal axis) is 250 µm, which covers about 25 defects continuing in the circumferential direction. The search frame of this size is a frame, which covers a circular arc piece, a part of the circle scratch as shown in FIG. 2 (b). As explained previously, the search frame following up the continuing defects is a template, which covers a circular arc of a circle scratch having a predetermined curvature, and is one, when shifting the search frame 9 less than 9 times, the detection of continuing defects for almost curved lines other than the circle scratch is terminated.

Further, the setting of the search frame 9 for the defect data is performed, for example, in such a manner that defect data in the region of the search frame 9 are extracted from the inspection area P and stored in a specified place in the work region 542g, and the stored defect data are processed. In this instance, defect data located on the frame lines of the search frame 9 can be included.

Herein, the reason why the width W (vertical axis) is determined as 50 µm (=10 µm×5) is that when the minimum length of middle size circle scratch desired to be detected is determined as 2 mm, a circular arc of 250 µm, ⅛ of 2 mm or less is accepted along the center line O of the search frame 9 and further remains a space which can accept not less than one defect in back and forth in the width direction.

The reason for the above is that a circle scratch does not necessarily run on a perfect circle, but includes variety kinds of circle scratches having slightly different curvatures from the inner circumference to the outer circumference of a magnetic disk 1. The width is required to cover such circle scratches. The size, which satisfies such requirement, is required to cover about 5 continuing defects in the radial direction. Further, as the size of the search frame 9, one that covers a circular arc piece of ¼~ 1/12 of the length of a minimum middle size circle scratch desired to be detected is desirable.

In the explained above case of circular arc piece having ⅛, the detection of continuing defects for almost curved lines other than the circle scratch is terminated, when shifting the search frame 9 less than 9 times.

Herein, as shown in FIG. 2 (b), the width W of the search frame 9 is smaller than the defect data search width RW and is desirable to be in a range of about 50 µm~100 µm, the length L thereof is determined according to such as the radius of the magnetic disk 1 and conditions of circle scratches to be detected and is desirable to be in a range of about 150 µm~500 µm. In addition, the defect data search width RW (the width of the inspection area P) is determined according to such as the radius of the magnetic disk 1 and conditions of circle scratches to be detected and is desirable to be in a range of about 0.5 mm ~2 mm, of which range is set as a range where curved line defects vary which are formed as such as circle scratches and parabolic line defects similar to the circle scratches affecting the data reading/writing.

Accordingly, in the circle scratches to be detected, the defects such as parabolic line defects similar to the circle scratches that are problematic to the data reading/writing can be included.

The MPU 541 executes the defect data sampling program 542a, inspects all tracks of the magnetic disk 1 while performing the spiral scan, calculates the coordinate values of detected defects according to pulse signals from the rotary encoder 2b and current positions of the head 4 on the magnetic disk 1 in the radial direction and causes to store the coordinate values as well as data indicating the kind of defect in the work region 542g in the memory as defect data (data with respect to a variety of defects).

Herein, as the defect data, although it is desirable to taken up as an object all of the defects detected as errors such as a spike error, a positive modulation error, a negative modulation error, a missing error and an extra error, it is acceptable to detect continuing defects of any one of the errors detected as defects or some among these errors detected as defects.

The MPU 541 executes the circle scratch search frame setting program 542b in response to a predetermined function key input corresponding to circle scratch detection, produces coordinate value data of the search frame (see the search frame 9 in FIG. 2 (b)) having a rectangular area of W×L on the magnetic disk according to the data in the parameter region 542f inputted from the key board 544 and causes to store the same in the work region 542g in the memory, and calls the circle scratch detection program 542c.

Subsequently, the MPU 541 executes the circle scratch detection program 542c, extracts defect data in the inspection area P (see FIG. 2 (a)) of one round component of the magnetic disk with the defect data inspection width RW set in advance in the radial direction from the work region 542g and causes to store separately in a predetermined region in the work region 542g as the defect data of the inspection area P, reads the coordinate value data of the search frame 9 stored in the work region 542g, extracts defect data in the region of the search frame 9 with reference to the defect data in the inspection area P and detects continuing defects in the region of the search frame 9. The search frame 9 (see FIG. 2 (b)) defined by the coordinate data is shifted in circumferential direction, herein, in clockwise direction, along defects in continuing defects while adding the search frame 9 successively.

With regard to the continuing defects followed up with the search frame 9, the number and length of the continuing defects covered by the entire region defined by the search frame before and after shifting are detected, when the detected continuing defects show having defects more than a predetermined value or a predetermined length, the continuing defects are determined as a circle scratch and the length and the coordinate data are stored in a predetermined area in the work region 542g, and the detection is proceeded to all of the continuing defects in the inspection area P. Further, by renewing the inspection area P detection for possible continuing defects is proceeded over the entire surface of the magnetic disk.

When the detection of the continuing defects on the entire surface of the magnetic disk has been completed in this manner, the circle scratch classification program 542d is called.

Subsequently, the MPU 541 executes the circle scratch classification program 542d and classifies the defects into three kinds of defects of a short circle scratch (herein below will be called as a short size), a middle circle scratch (herein below will be called as a middle size) and a long circle scratch (herein below will be called as a long size) with reference to size classification reference values (1 mm, 10 nm) of the circle defects in the parameter region 542f.

With respect to the size classification of short, middle and long, the length of the continuing defects less than 1 mm (=10 µm×100 pieces) is classified as short and the length of the continuing defects more than 10 mm (=10 µm×1000 pieces) is classified as long and the length between both is classified as middle, and the number, length and coordinate (coordinate of the start point and end point) of the respective defect data are stored in the work region 542g. Thereafter, the disk acceptance and rejection judgment program 542e is called.

Further, the size classification value of the circle scratch can be the number of the total defects in the defect series of the circle scratch other than the length of one circle scratch. In this instance, as the reference, number of defects less than 100 pieces and number of defects more than 1000 pieces are selected, and the number of defects less than 100 pieces is classified as short, the number of defects more than 1000 pieces is classified as long and the number of defects between both is classified as middle.

Further, herein, in connection with the length L of the search frame 9, although continuing defects are detected, while being followed up by shifting the search frame 9 in plurality of times, for example about four times, as a part of circle scratch and judged as short, in the defects as judged short, pieces of curved line defects not running along the circumferential direction, curved line defects having a small curvature and oppositely, curved line defects having an excessively large curvature are frequently included. These defects do not need to be treated as problematic circle scratches. Problematic circle scratches or real circle scratches are ones of which sizes are classified as middle or long having length more than 1 mm. The entire length of problematic continuing defects of middle and long size circle scratch is covered by shifting the search frame 9 by five times or more while adding the same. The maximum length of the continuing defects of 5 times adding the search frame 9 is substantially equal to 5×(250 µm~10 µm). Herein, it is because the reason why the length of the search frame 9 is decided with (250 µm−10 µm) becomes the start point of the subsequent search frame 9 which the last defect of the defect series in the search frame is set up to next here. And, as for this point, it is mentioned later.

The length of 4×(250 µm−10 µm) is less than 1 mm though the length of 5×(250 µm−10 µm) is more than 1 mm. As has been explained above, though the minimum length of middle size circle scratch desired to be detected is assumed 2 mm, it is 1 mm with this example. Therefore, the line shaped defect which become the continuting defect decided in a range of the length of 1 mm~2 mm from a circle scratch and a variety of defects is classified as middle.

A reason to set the minimum length of the circle scratch of middle size at 1 mm is to secure reliability about the decision of a success disk. If it has it from this point, the length L (=250 µm) of the reference frame 9 is decided as a thing which the circular arc fragment of that ¼ appears through against the circle scratch of the length of 1 mm. And, the maximum length of a continuity defect which succeeds a reference frame 9 8 times and to add and which is detected is less than 2 mm, is detected handles it as a thing of the range of 2 mm of the minimum length of the circle scratch of middle size.

Further, for the judgment and classification of the problematic circle scratches, both the length of the defects and the number of defects can be employed. A proper classification can be effected depending on AND condition and OR condition thereof. The number of sizes for classification is not limited to the three classifications of short, middle and long.

Subsequently, the MPU 541 executes the disk acceptance and rejection judgment program 542e and for the first time judges whether there exists a long size circle scratch with reference to the work region 542g. As the result of the judgment, if there exists at least one such scratch, the magnetic disk inspected is determined as NG and the magnetic disk is stored in a cassette for NG.

If not (no long size circle scratch exists) subsequently, whether there exist more than a predetermined number of middle size circle scratches is judged. The predetermined number is, for example determined as 10 pieces and when there exist more than 10 pieces of such scratches, the magnetic disk inspected is determined as NG and the magnetic disk is stored in the cassette for NG.

Herein, the reason why there exist more than 10 pieces of scratches is that it is to the benefit which makes that decision have reliability by judging a success disk about middle size including the line-shaped defect which consists of circle scratches and various defects in the range of the length of 1 mm~2 mm here.

If not so, subsequently, whether there exist more than a predetermined number of short size circle scratches is judged. The predetermined number is, for example determined as 30 pieces and when there exist scratches more than that, regardless to existence and absence of problematic circle scratches, the magnetic disk inspected is determined as NG and the magnetic disk is stored in the cassette for NG. If not so, the magnetic disk inspected is determined as a success disk (a acceptable disk GD) and the success magnetic disk is stored in a cassette for GD.

Figure 3:
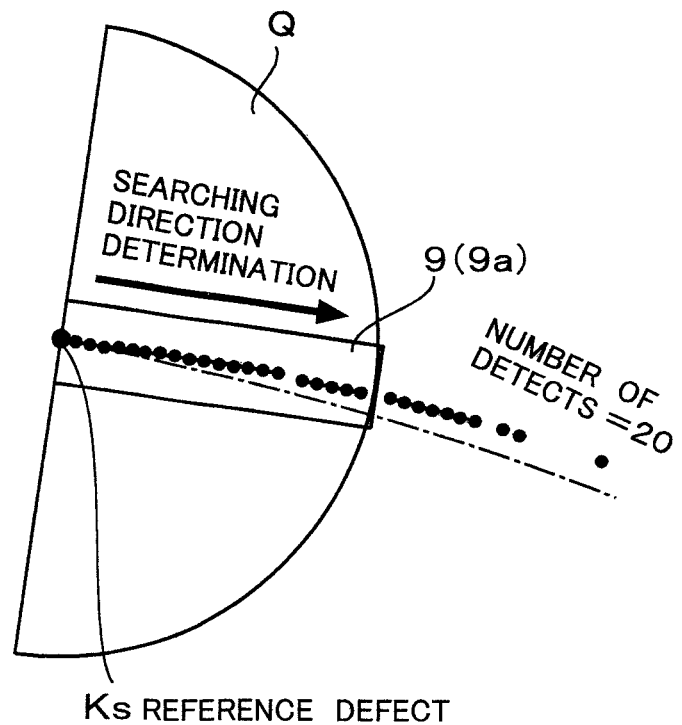
FIG. 3 (*a*) is a view for explaining a determination of search direction of a search frame with respect to a reference defect for starting a search.
Figure 3:
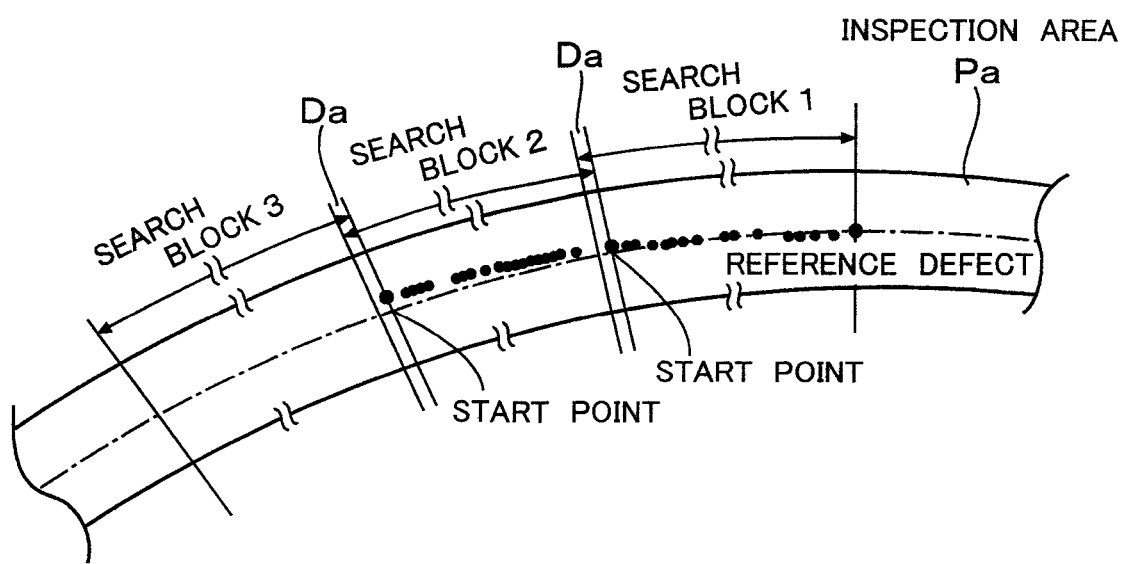
Figure 4:
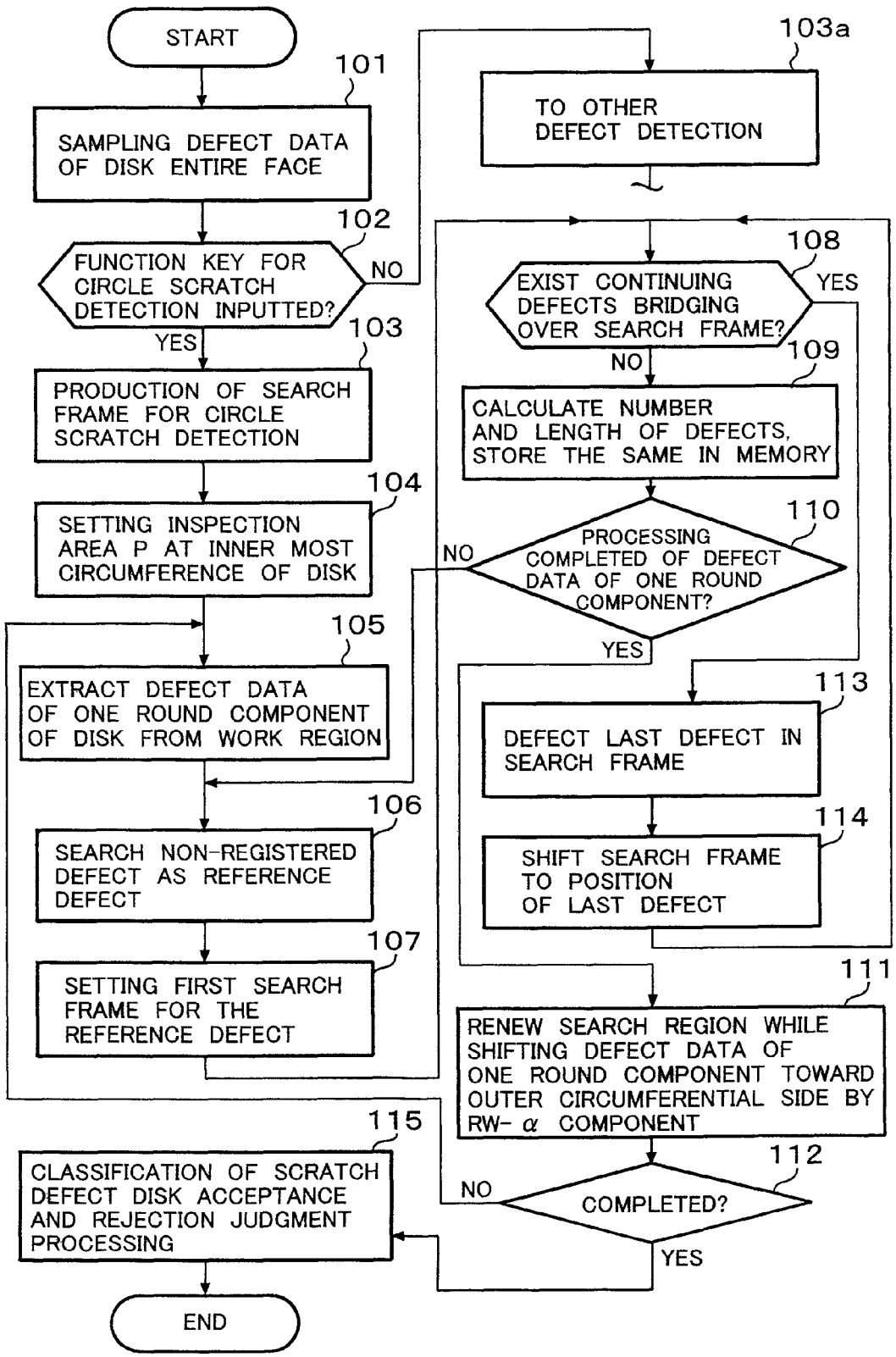
FIG. 4 is a flowchart for a circle scratch detection process.

Herein below, the circle scratch detection processing will be explained with reference to views for explaining the circle scratch detection as shown in FIGS. 2 and 3 and the flowchart of the circle scratch detection processing as shown in FIG. 4.

FIG. 2 (*a*) is an inspection area P of defect data having defect data search width RW corresponding to the radial direction of the magnetic disk 1 and while limiting the shifting of the search frame 9 in the inspection area P, the range of defect data searching is limited in the range of the search width RW. The search frame 9 follows up continuing defects and is shifted within the range of inspection area P along the same.

The search width RW of the inspection area P cuts among curved line shaped continuing defects the curved line defects not running along the circumferential direction, the curved line defects having small curvature and oppositely, the curved line defects having an excessively large curvature. Accordingly, in the present embodiment, with respect to these curved line continuing defects the detection of these continuing defects is terminated by shifting the search frame 9 in 8 times or less.

FIG. 2 (*b*) is a view for explaining the search frame 9 within the range of the inspection area P having the defect data search width RW corresponding to the radial direction.

The search frame 9 has a width W and a length L and these values of width W and length L are inputted from the keyboard 544 and stored in the parameter region 542f. These values can be modified depending on such as minimum value of a defect to be detected and the radius of the magnetic disk. As has been explained previously, the width W is less than ½ of the width RW, in that smaller than the defect data search width RW and the size thereof is covered by the defect data search width RW of the inspection area P.

The shifting direction of the search frame 9 is in clockwise direction in FIG. 2 (*b*), which corresponds to the circumferential direction of the magnetic disk 1. The start point is a start point of the continuing defects in a search frame 9a (9) and which is a reference defect Ks. Wherein, a first search frame 9a (9) is set so that the reference defect Ks meets the center of the left end side (the side of the frame in width direction when the frame shifts in clockwise direction) of the search frame 9a (9). Further, as the shifting direction of the search frame 9, anti-clockwise direction can be used, which will be explained later, or as the shifting direction, both can be respectively employed.

As the reference defect Ks, the first non-registered defect is selected during the shifting process of the search frame 9. Discovered defects in the search frame 9 are stored by means of the position coordinates thereof in a predetermined region of the memory 542 and become registered defects. Thus the defects not stored in the predetermined region of the memory 542 are the non-registered defects.

The search frame 9 follows up the sampled defect data in clockwise direction along the continuing defects in the inspection area having the defect data search width RW corresponding to the radial direction and shifts by one round component of the magnetic disk (one round component of a track), in such a manner that when no continuing defects are found out, a first non-registered defect with respect to the defect data of the same one round component is searched and using the same as the subsequent start point the shifting is repeated.

When no non-registered defects of the defect data for the one round component are found out, the inspection area P is further shifted from the inner circumference of the magnetic disk toward the outer circumference and a renewed inspection area P is set for the sampled defect data on the magnetic disk. Then for the renewed inspection area P, the search frame 9 is shifted in the like manner and the continuing defects are successively detected.

Herein, the shifting of the inspection area P from the inner circumference to the outer circumference will be explained.

When no non-registered defects in the defect data for one round component of the inspection area P having the defect data search width RW corresponding to the radial direction are found out, the searching by the search frame 9 for the defect data of one round component has been completed. Thereafter, the inspection area P having the defect data search width RW is renewed by the amount of RW-α in the radial direction toward the outer circumferential side. Thereby, the inspection area P is shifted from the inner circumference to the outer circumference in a manner that only a part (a component) of the defect data search width RW is overlapped. Further, the overlapping width α is desirable to be one which covers about 2~3 defects. When the defect to be detected is about 10 μm, the overlapping width is about 20~30 μm.

Further, isolated or continuing defects of about 1~5 pieces detected in the range set by the respective search frames 9 are registered by means of the respective coordinate values of the defects as non-continuing defects (isolated defects) and the result is neglected. The respective defect data constituting the continuing defects other than the above are registered successively in the work region 542g by means of the respective coordinate values as continuing defects and the remaining ones form the non-registered defects.

The continuing defects are registered, for example, by setting a flag representing continuity and by storing the position coordinate as continuing defects and are separated from isolated defects. Alternatively, the continuing defects are registered in a region for continuing defects separate from the isolated defects.

As shown in FIG. 2 (*b*), the direction of the first search frame 9a (9) using the reference defect Ks (defect at start point) is set so that the center line O in the direction of length L of the search frame 9a coincides with the direction of the continuing defects. The center line O is the frame center line in the length direction of the search frame 9a (9). The reference defect Ks (start point of the search frame 9a) in FIG. 2 (*b*) is on a crossing point between one side in width direction of the search frame 9a and the center line O. The same is true with regard to reference defect Kb (start point) of the shifted search frame 9b.

Further, at this instance, when a plurality of continuing defects are covered by the search frame 9, the continuing defects having the longest length or the largest number of defects are employed. When the numbers of defects or the lengths thereof are the same, the continuing defects are employed which further includes the reference defects Ks (defect at the start point) and the remotest defect from the start point covered by the search frame (the most distant last defect in the defect series within the search frame from the start point).

Now, the continuing defects, which continue but the defects are interrupted in the midway by less than a predetermined number, for example, a unit of three pieces or less, are also assumed as continuing defects herein. Namely, defects forming a defect series are assumed as the continuing defects while neglecting interruption of defects by three pieces or less in the midway thereof. Because the defect interruption of such extent in the midway on continuing defects exceeding over five pieces is judged as detection mistake during the inspection. In the course of defect detection of about 10 μm, detection interruption of about three pieces of defects may happen usually.

As the shifting direction of the search frame 9, the direction of the search frame 9 of second time and thereafter, namely, the continuing defects follow-up direction (shifting direction) is determined, after detecting the remotest defect from the start point, as the direction of a straight line M formed by connecting the start point defect and the remotest defect. Thereby, the follow-up according to such as the radius of the magnetic disk and the curved line condition of circle scratch to be detected can be performed.

The above is performed through the processing of the circle scratch search frame setting program.

Herein below, the detail thereof will be explained.

For the first time, the direction determination of the first search frame 9 using the reference defect Ks as the start point will be explained with reference to FIG. 3 (*a*).

As shown in FIG. 3 (*a*), the search frame 9 is rotated by ±90° (180°) in the semicircular range Q around the reference defect Ks, the defects having continuity are searched among the defects in the range of the defect data search width RW and the center line O of the first search frame 9 (the search frame 9a in FIG. 2 (*b*)) is set on a straight line formed by these defects or on a straight line formed by connecting these many defects. Namely, the search frame 9 (9a) is oriented so that the direction of the center line O along the direction of the length L coincides with the direction of the straight line formed by defects. In this instance, the reference defect Ks is located on the center on the left end frame line in the width direction of the search frame 9 (9a). The search frame 9a in FIG. 2 (*b*) shows such condition.

Further, the reason why the searching of the continuing defects is performed in the semicircular range Q oriented to the clockwise direction is that the searching direction is determined to the clockwise direction. The reason why the angle of the semicircle is slightly inclined is that the direction of the defect series of the non-registered defects is found out at the position in the rotation angle.

Subsequently, the follow-up and shifting operation of the search frame 9 for the continuing defects will be explained.

With respect to the set search frame 9 (the search frame 9a in FIG. 2 (*b*)), when the defects show continuity bridging over the frame region of the search frame 9, the subsequent search frame 9 (the search frame 9b in FIG. 2 (*b*)) following up such continuing defects is set in a manner being added (in a manner being connected) to the first search frame 9 (search frame 9a). Such adding is effected by using the last defect of the defect series in the first search frame as the start point for the subsequent search frame.

The follow-up and shifting of the search frame 9 is determined whether the defects continue while bridging over the search frame 9. The judgment whether the defects continue while bridging over the search frame 9 is determined whether the defects continue near (length to the respective frame lines which covers about three defects) to any of remaining three sides other than the one side of the search frame where the start point locates. In other words, the defect which bridges over is determined whether the coordinate position of the last defect on the defect series in the search frame is close to the coordinate position of the search frame line by three pieces of defect component (=30 μm) or less. Of course, the ground of using the three pieces of defect component criteria is that since in the course of defect detection of about 10 μm, detection interruption of about three pieces of defects may happen usually, such defect interruption is presumed to have happened in the midway of the continuing defects near the frame line. Further, when the last defect locates on the frame line of the search frame 9, the defect is presumed to possibly extend across the frame and to become the bridging defect over the subsequent frame.

When continuity of a defect bridging over the search frame 9 is found out, as shown in the search frame 9*a* in FIG. 2 (*b*), the remotest defect from the reference defect Ks is searched from the defect coordinate to detect the remotest defect Ka. While using the defect Ka as the start point of the subsequent search frame 9*b*, the straight line M formed by connecting the defect (reference defect Ks) representing the start point for the prior frame and the last defect Ka is determined as the direction of the search frame 9*b* (the search frame 9). While setting the center line O of the subsequent search frame 9*b* in that direction, the search frame 9 is shifted from the position of the search frame 9*a* to the position of the search frame 9*b*. In other words, the detection of the defect data for the subsequent object in the continuing defects is performed by extracting ones located in the position of the search frame 9*b*.

As shown in FIG. 2 (*b*), even in the search frame 9*b*, since the continuing defects continue bridging over the frame of the search frame 9*b*, in the like manner, by searching the remotest defect from the defect Ka (defect at the start point) is detected as the remotest defect Kb and using this as the start point for the search frame 9*c*, the direction of the search frame 9*c* (search frame 9) is set on the straight line formed by connecting the start point defect (defect Ka) of previous search frame 9*b* and the last defect Kb. Thereafter, in the same manner, while detecting continuity of defects bridging over the frame of the search frame 9, the search frame 9 is shifted and the continuing defects are followed up.

In such manner, so long as the continuing defects continue, the search frame 9 is successively added with the range of the defect data search width RW. The shifting by the addition is terminated when the defects lose the continuity or when the continuity is interrupted by exceeding beyond three pieces of defects. Further, the detection is terminated when the defects in the search frame 9 exceed beyond the range of the defect data search width RW (inspection area P). Thereafter, the subsequent non-registered reference defect Ks is searched in the inspection area P.

As has been explained above, the search direction of the first search frame 9 is determined by rotating the search frame 9 with the radial length L around the reference defect Ks in the range of the semicircle Q as shown in FIG. 3 (*a*), however, when there are continuing defects continuing more than 5 pieces in another direction, the search frame 9 is also set in that direction by adding the same and the searching of continuing defects is continued.

In such manner, the respective defects within the range defined by successive addition of the search frame 9 in the range of the inspection area P are detected as a circle scratch and one formed by the respective continuing defects is successively stored and registered as one circle scratch together with the individual defect coordinates of the respective continuing defects in the work region 542*g* of the memory 542.

Further, continuing defects more than a predetermined value, herein having continuing defects more than five pieces, which have only a length within the range of the search frame 9*a* with the reference defect Ks and remain within the region are also treated as a circle scratch, because the same are classified and processed as continuing defects later.

In this manner, after once detecting the continuing defects with the range of the search frame 9 having a width in the radial direction, by adding the search frame the continuity of the defects is further detected, thereby, curved line shape continuing defects, which are covered by the inspection area P can be detected. Further, since the curved line shape continuing defects are followed up by limiting the same with the search frame 9, the defects detected can be limited to circle scratches without being affected by the surrounding line shaped defects.

FIG. 4 is an overall processing flow for the detection of such circle scratches.

At first, The MPU 541 executes the defect data sampling program 542*a* and the defect data of the entire surface of the magnetic disk are sampled in the work region 542*g* together with the defect coordinates of the defect data (step 101).

Subsequently, the process goes to the judgment whether the function key input is for circle scratch detection (step 102). When keys other than a predetermined function key corresponding to the circle scratch detection are input, the result goes to NO and the process moves to a defect detection processing corresponding to the inputted function key (step 103*a*).

When the predetermined function key corresponding to the circle scratch detection is inputted, the result goes to YES and the MPU 541 executes the circle scratch search frame setting program 542*b*, produces data for the search frame 9 and prepares the search frame 9 (step 103).

Subsequently, the MPU 541 executes the circle scratch detection program 542*c* and sets the inspection area P having the defect data search width RW corresponding to the radial direction at the inner most circumference (step 104), extracts defect data of one round component of the magnetic disk from the work region 542*g* (step 105) and searches the reference defect Ks from the non-registered defects (step 106).

For the reference defect Ks the first search frame 9 is set (step 107) and with reference to the defect data in the region range of the set search frame 9 whether there are continuing defects bridging over the search frame 9 is judged (step 108). Herein, when the result is NO, the number of defects and the length of the defects in the search frame 9 are calculated and are stored in a predetermined work region 542*g* of the memory 542 (step 109).

Further, when the judgment in step 108 is YES, the last defect in the search frame is detected (step 113), the search frame 9 is shifted using the position of the last defect in the search frame 9 as the start point (step 114) and then the process returns to step 108. Thereafter, in the subsequent step 109, different from the above processing, the total number of defects and the total defect length in the search frame 9 before shifting and in the search frame 9 after shifting are calculated as a whole and are stored in the predetermined work region 542*g* of the memory 542.

After step 109, depending on the existence and absence of the non-registered defects whether the searching of defect data of one round component has been completed is judged (step 110), herein when the result is NO, the process returns to step 106 and the same processing is repeated. When the judgment at step 110 is YES, the inspection area P having the defect data search width RW corresponding to the radial direction is shifted toward outer circumferential side by a component of RW-a and the search range is renewed (step 111), whether the inspection has been completed up to the outer circumference of the magnetic disk is judged (112), herein when the result is NO, the process moves to the processing at step 105 and the like processing as above is repeated.

When the judgment at step 112 turns to YES, the scratch defect classification processing is performed and the process enters into the magnetic disk acceptance and rejection judgment processing (step 115).

In the above, although the inspection is performed by successively renewing the defect data of one round component in circumferential shape with the inspection area P, the circle scratch detection can be performed by restricting the range of the defect data by means of such as a spiral and blocks.

FIG. 3 (*b*) is a view for explaining such embodiment. The present embodiment is an example in which the search frame 9 is shifted in anti-clockwise direction opposite to that in FIG. 2 (*b*)

The inspection area P is set as a spiral inspection area Pa corresponding to the spiral scan, different from the one round component, the inspection area Pa is divided along the circumferential direction into blocks such as search block 1, search block 2 search block 3 . . . while keeping an overlapping region Da and defect data corresponding to the respective blocks are extracted. Then the search frame 9 is caused to follow up in the like manner but in the opposite direction as in FIG. 2 (*b*) for the defect data of every respective blocks and circle scratches in the respective blocks are successively detected.

In the instance, the inspection area Pa is constituted by the blocks having a predetermined length five times or more longer than that of the search frame for the defect data of one round component of the magnetic disk. For the defect data in the successively set respective search blocks such as search block 1, search block 2, search block 3 . . . the search frame 9 is shifted in the range of the respective blocks.

In the present embodiment, the width of the spiral shaped inspection area Pa with defect data search width RW is determined more than two times of the width W of the search frame 9 and the block length thereof is determined in the range of 5~10 times of that of the search frame, and the defect data in the inspection area are successively read by the block unit and the detection processing of circle scratches is desirable to be performed correspondingly to the respective blocks.

In the embodiments as referred above, the width W and the length L of the search frame 9 are selected to permit the following up of a circle scratch without being affected by the surrounding line shaped defects. Since a circle scratch does not necessarily run on a complete circle and the curvatures thereof are slightly different at the inner circumferential side and at the outer circumferential side of the magnetic disk. Therefore, the width W and the length L of the search frame 9 are determined in view of the above. Since the search frame 9 has a certain extent of width, parabolic shaped defects can be detected therewith.

Since the search frame 9 herein is a frame of which size (length and width) is possible to cover a circular arc piece of variety kinds of circle scratches, namely constitute a template frame, variety kinds of circle scratches having slightly different curvatures from the inner circumference to the outer circumference of the magnetic disk can be detected.

As a result, a circle scratch having a certain extent of length and a parabolic line like the former, which may affect the acceptance and rejection of the magnetic disk, can be positively detected.

Further, in the above embodiment, even when continuing defects having a length or number of defects bridging over the prior search frame are detected, since the direction of the region of the subsequent search frame 9 is set on the direction formed by connecting the start point and the last defect in the region of the prior search frame, line shaped defects not forming the circular curved line shape run out from the frame of the subsequent or further subsequent search frame 9 while being restricted by the width RW of the inspection area P and are detected as short length defects through shifting the search frame of about 8 times.

Further, in the embodiment above, when the continuing defects bridge over the region of the search frame 9, the remotest defect from the start point is selected as the subsequent start point defect for the region of the subsequent search frame 9, however, in the present invention, the subsequent start point defect for the region of the subsequent search frame 9 is not limited to the remotest defect. The subsequent start point defect may be a next defect continuing to the remotest defect.

In the embodiment above, by successively shifting the region of the search frame 9 in the inspection area P with the width RW, the circle shaped defects can be followed up with the length of the search frame 9 along the curved line. Thereby, defects having comparatively long length as detected can be substantially detected as a circle scratch without being affected by the surrounding line shaped defects.

In the embodiment as has been explained above, while assuming that the defects having defect interruption less than three pieces keep the continuity, the continuing defects bridging over the frame are determined whether the defects in the search frame 9 continue from one at the start point to one near (the length to the frame line can cover about three pieces of defects) to any one of sides. However, in the present invention, in place of the remotest defect, a prior defect less than three pieces to the frame can be selected as the start point defect for the subsequent search frame regardless to the existence and absence of defect interruption. Of course, for the same reason, the shifting direction of the search frame can also be the direction formed by connecting the defect of the previous start point and the prior defect less than three pieces to the frame.

Further, in the embodiment, although the inspection area P is set to be shifted from the inner circumference to the outer circumference of the magnetic disk, in the present invention, the inspection area P can, of course, be set to be shifted from the outer circumference to the inner circumference of the magnetic disk.

Further, in the embodiment, for the defect detection the magnetic disk has been spirally scanned, however, the present invention is not limited to the spiral scan of the magnetic disk.

The invention claimed is:

1. A method of detecting scratch defect in circumferential direction in a magnetic disk certifier which includes a write head and a read head and detects defects of a magnetic disk by writing test data through the write head while scanning the magnetic disk and by reading the test data through the read head, and which performs the following steps:

through inspection of the magnetic disk defect data and the positions thereof on the magnetic disk are sampled, an inspection area for the sampled defect data is set which has a predetermined width in the radial direction of the magnetic disk and a length round the circle of the magnetic disk in the circumferential direction thereof or a predetermined length in the circumferential direction thereof, through setting a rectangular search frame for the defect data in the inspection area which has a certain width shorter than the predetermined width for the inspection area and a certain length shorter than the predetermined length in perpendicular direction with respect to the width, continuing defects are detected in which a plurality of defects continue in series in a region of the search frame, the search frame is successively shifted according to the continuing direction of the detected continuing defects so that the detected continuing defects are located in the region of the search frame so long as the detected continuing defects continue in the inspection area, and through detecting length or defect number of the detected continuing defects in the entire regions of the search frame before and after the shifting, the continuing defects having a length or a defect number more than a predetermined value is detected as a scratch defect in circumferential direction in the inspection area.

2. A method of detecting scratch defect in circumferential direction according to claim 1, wherein the continuing defects are defects in series of which number exceeds 5 pieces, the length and width size of the search frame is determined to cover ¼ or less circular arc of the length of minimum scratch defects in the circumferential direction desired to be detected and through shifting the search frame in a manner of adding the search frame five times or more, the scratch defects in the circumferential direction are detected.

3. A method of detecting scratch defect in circumferential direction according to claim 1, wherein the detection of the continuing defects is performed in such a manner that a certain defect in the defect data of the inspection area is selected as a start point for the search frame and the defects continuing to the certain defect are detected, through shifting the search frame the length or number of defects of the continuing defects within the search frame are detected and when there exist the continuing defects bridging over the search frame, the remotest defect from the start point or a prior defect less than three pieces therefrom is selected as a subsequent start point for the subsequent search frame and the search frame is subsequently shifted.

4. A method of detecting scratch defect in circumferential direction according to claim 3, wherein the position of the start point in the search frame is on a crossing point of one side in width direction of the rectangle and the center line of the frame in the longitudinal direction thereof and the shifting direction of the search frame is determined in such a manner that the center line is positioned on a direction formed by connecting the start point of the search frame before shifting and the remotest defect or the prior defect less than three pieces therefrom.

5. A method of detecting scratch defect in circumferential direction according to claim 4, wherein the defect data to be sampled are ones to be acquired by inspecting the entire face of the magnetic disk, the continuing defects include ones in which the defects of a predetermined number or less are interrupted in the series of the defects in the midway thereof and the inspection area is successively set in the radial direction from the inner circumference to the outer circumference or oppositely of the magnetic disk.

6. A method of detecting scratch defect in circumferential direction according to claim 5, wherein the predetermined number of the defects is three pieces or less.

7. A method of detecting scratch defect in circumferential direction according to claim 6, wherein ones detected as the continuing defects are stored and registered in a memory, the certain defect is a non-registered defect, the predetermined width of the inspection area is in a range of 0.5 mm-2 mm, the length of the inspection area is longer than the predetermined width and the width of the search frame is in a range of 50 µm~100 µm and the length thereof is in a range of 150 µm~500 µm.

8. A method of detecting scratch defect in circumferential direction according to claim 4, wherein the inspection area is divided into a plurality of blocks for the defect data of one round component of the magnetic disk, each block having length five times or more longer than that of the search frame and the search frame is set for defect data of the divided block and the search frame is shifted in the range of the block.

9. A magnetic disk certifier which includes a write head and a read head and detects defects of a magnetic disk by writing test data through the write head while scanning the magnetic disk and by reading the test data through the read head comprising:

a defect data sampling means which samples through inspection of the magnetic disk defect data and the positions thereof on the magnetic disk, an inspection area setting means which sets an inspection area for the sampled defect data which has a predetermined width in the radial direction of the magnetic disk and a length round the circle of the magnetic disk in the circumferential direction thereof or a predetermined length in the circumferential direction thereof, a continuing defect detecting means which, through setting a rectangular search frame for the defect data in the inspection area which has a certain width shorter than the predetermined width for the inspection area and a certain length shorter than the predetermined length in perpendicular direction with respect to the width, detects the continuing defects in which a plurality of defects continue in series in a region of the search frame, and a search frame shifting means which successively shifts the search frame according to the continuing direction of the detected continuing defects so that the detected continuing defects are located in the region of the search frame so long as the detected continuing defects continue in the inspection area, wherein through detecting length or defect number of the detected continuing defects in the entire regions of the search frame before and after the shifting, the continuing defects having a length or a defect number more than a predetermined value is detected as a scratch defect in circumferential direction in the inspection area.

10. A magnetic disk certifier according to claim 9, wherein the continuing defects are defects in series of which number exceeds 5 pieces, the length and width size of the search frame is determined to cover ¼ or less circular arc of the length of minimum scratch defects in the circumferential direction desired to be detected and through shifting the search frame in a manner of adding the search frame five times or more, the scratch defects in the circumferential direction are detected.

11. A magnetic disk certifier according to claim 10, wherein the position of the start point in the search frame is on a crossing point of one side in width direction of the rectangle and the center line of the frame in the longitudinal direction thereof and the shifting direction of the search frame is determined in such a manner that the center line is positioned on a direction formed by connecting the start point of the search frame before shifting and the remotest defect or the prior defect less than three pieces therefrom.

12. A magnetic disk certifier according to claim 11, wherein the defect data to be sampled are ones to be acquired by inspecting the entire face of the magnetic disk, the continuing defects include ones in which the defects of a predetermined number or less are interrupted in the series of the defects in the midway thereof and the inspection area is successively set in the radial direction from the inner circumference to the outer circumference or oppositely of the magnetic disk.

13. A magnetic disk certifier according to claim 12, wherein the predetermined number of the defects is three pieces or less.

14. A magnetic disk certifier according to claim 13, wherein ones detected as the continuing defects are stored and registered in a memory, the certain defect is a non-registered defect, the predetermined width of the inspection area is in a range of 0.5 mm~2 mm, the length of the inspection area is longer than the predetermined width and the width of the search frame is in a range of 50 μm~100 μm and the length thereof is in a range of 150 μm~500 μm.

15. A magnetic disk certifier according to claim 10, further comprising a processor and a memory, wherein the continuing defect detecting means includes a search frame setting means which selects a certain defect in the defect data of the inspection area as a start point for the search frame and detects the defects continuing to the certain defect and wherein the defect data sampling means, the inspection area setting means, the continuing defect detecting means and the search frame shifting means are realized when the processor executes programs stored in the memory.

16. A magnetic disk certifier according to claim 9, wherein the continuing defect detecting means detects the continuing defects in such a manner that a certain defect in the defect data of the inspection area is selected as a start point for the search frame and the defects continuing to the certain defect are detected, the search frame shifting means detects the length or number of defects of the continuing defects within the search frame through shifting the search frame and when there exist the continuing defects bridging over the search frame, selects the remotest defect from the start point or a prior defect less than three pieces therefrom as a subsequent start point for the subsequent search frame and shifts the search frame subsequently.

* * * * *